(12) United States Patent
Scalf et al.

(10) Patent No.: US 7,430,453 B2
(45) Date of Patent: Sep. 30, 2008

(54) REMOTE REPLICATION OF LOCAL ACTUATOR MODE SELECTION

(75) Inventors: Gerald W. Scalf, Houston, TX (US); Michael H. Truitt, Houston, TX (US)

(73) Assignee: EIM Company, Inc., Missouri City, TX (US)

( * ) Notice: Subject to any disclaimer, the term of this patent is extended or adjusted under 35 U.S.C. 154(b) by 1012 days.

(21) Appl. No.: 10/154,222

(22) Filed: May 22, 2002

(65) Prior Publication Data

US 2003/0088323 A1 May 8, 2003

Related U.S. Application Data

(60) Provisional application No. 60/337,556, filed on Nov. 8, 2001.

(51) Int. Cl.
*G06F 17/00* (2006.01)
(52) U.S. Cl. .......................................... 700/90; 700/19
(58) Field of Classification Search .................. 700/19, 700/83, 86; 318/562; 330/136; 307/141; 123/41 R
See application file for complete search history.

(56) References Cited

U.S. PATENT DOCUMENTS 3,659,566 A * 5/1972 Zucca ....................... 123/41 R
4,007,458 A 2/1977 Hollabaugh
4,078,196 A * 3/1978 Thadani ...................... 318/562

(Continued)

FOREIGN PATENT DOCUMENTS

GB 2267582 A 12/1993

OTHER PUBLICATIONS http://en.wikipedia.org/wiki/RS-485.*

(Continued)

*Primary Examiner*—Michael B Holmes
(74) *Attorney, Agent, or Firm*—Shaper Iler LLP; Sue Z. Shaper (57) ABSTRACT

A system comprising a local site served by at least one remote site in digital logic communication therewith, the system further comprising mode selection logic including a hierarchy that prioritizes modes available at the local site. The hierarchical priority of a particular mode that may be selected at the local site or at any one of the remote sites determines the mode in which the local site will operate, further depending on the current mode selection state at other remote or local sites. A presently preferred embodiment of the invention is a valve actuator having three-way local mode selection capability (local/remote/off), where such mode control is additionally served by at least one remote site connected via a serial link to the local site of the actuator. In this exemplary embodiment, a hierarchy prioritizes these modes in the following order of high priority to low priority: (1) off; (2) local; (3) remote. Under the logic of the invention, if the "off" mode is selected at the local site or any one of the remote sites, then all the sites will behave in "off" mode. If the "local" mode is selected at the local site or any one of the remote sites, and no site is in "off" mode, then all the sites will behave in "local" mode. If the "remote" mode is selected at the local site and all of the remote sites, then all the sites will behave in "remote" mode.

82 Claims, 2 Drawing Sheets

U.S. PATENT DOCUMENTS

| | | | |
|---|---|---|---|
| 4,253,148 A | | 2/1981 | Johnson et al. |
| 4,420,669 A | * | 12/1983 | Scalf et al. ............... 219/718 |
| 4,430,540 A | * | 2/1984 | Scalf ........................ 219/720 |
| 4,744,218 A | | 5/1988 | Edwards et al. |
| 5,334,947 A | * | 8/1994 | Werrbach .................. 330/149 |
| 5,452,201 A | * | 9/1995 | Pieronek et al. ............. 700/83 |
| 5,519,636 A | | 5/1996 | Stoll et al. |
| 5,530,643 A | * | 6/1996 | Hodorowski ................. 700/86 |
| 5,687,091 A | * | 11/1997 | Maung et al. .............. 700/266 |
| 5,874,789 A | * | 2/1999 | Su .............................. 307/141 |
| 6,192,281 B1 | | 2/2001 | Brown et al. |
| 6,411,691 B1 | * | 6/2002 | Pasdeloup et al. ...... 379/102.04 |
| 6,424,928 B1 | * | 7/2002 | Elliott et al. ............... 702/151 |
| 6,577,985 B2 | * | 6/2003 | Scalf ........................... 702/163 |
| 6,615,156 B2 | * | 9/2003 | Elliott et al. ............... 702/151 |
| 6,847,852 B2 | * | 1/2005 | Hennion ....................... 700/45 |
| 6,859,668 B1 | * | 2/2005 | Ginzburg et al. .............. 700/19 |

OTHER PUBLICATIONS

Some novel µP-based configurations for controlling remotely located stepper motors as actuators of control valves Singh, H.; Sharma, S.M.; Industrial Electronics, IEEE Transactions on vol. 38, Issue 4, Aug. 1991 pp. 283-287 Digital Object Identifier 10.1109/41.84022.*

Prototype design and test results of a high temperature remote actuator controller Fong Shi; Martin, K.; High Temperature Electronics Conference, 1998. HITEC. 1998 Fourth International Jun. 14-18, 1998 pp. 1-4 Digital Object Identifier 10.1109/HITEC.1998.676750.*

Reduced order sliding mode control for pneumatic actuator Paul, A.K.; Mishra, J.E.; Radke, M.G.; Control Systems Technology, IEEE Transactions on vol. 2, Issue 3, Sep. 1994 pp. 271-276 Digital Object Identifier 10.1109/87.317984.*

Intelligent servo hydraulic device for the control of the motion Comes, M.; Drumea, A.; Mirea, A.V.; Matache, G.; Electronics Technology: Concurrent Engineering in Electronic Packaging, 2001. 24th International Spring Seminar on May 5-9, 2001 pp. 282-285 Digital Object Identifier 10.1109/ISSE.2001.931083.*

A novel micromachined magnetic membrane microfluid pump Khoo, M.; Liu, C.; Engineering in Medicine and Biology Society, 2000. Proceedings of the 22nd Annual International Conference of the IEEE vol. 3, Jul. 23-28, 2000 pp. 2394-2397 vol. 3 Digital Object Identifier 10.1109/IEMBS.2000.900628.*

* cited by examiner

REMOTE REPLICATION OF LOCAL ACTUATOR MODE SELECTION

RELATED APPLICATION(S)

This non-provisional application claims the benefit of U.S. provisional patent application REMOTE REPLICATION OF LOCAL ACTUATOR MODE SELECTOR, Ser. No. 60/337,556, filed Nov. 8, 2001.

TECHNICAL FIELD OF THE INVENTION

This application relates generally to systems for use in remote replication of local functionality, and more specifically to a system for remote replication of local valve actuator mode selection.

BACKGROUND OF THE INVENTION

Systems are known in the art where local functionality can be controlled remotely. Such prior art systems are occasionally referred to as "slave" or "drop down" systems, in which the remote activation allows a remote operator to activate certain local functionality without having to be physically present at the local site.

In order to enable such remote control over local functionality, it is also conventional for each local site to have "mode" selection available, where an operator may ordain whether the local functionality may be controlled locally, or remotely, or shut down. In most conventional systems, remote mode will need to be selected to enable remote activation of the local functionality.

The example of tanks at a water treatment plant is illustrative. Typically there will be valve actuators located at the top of tanks and the plant operation level is at the bottom of the tanks. Alternatively, the valve actuators may be located at the bottom of the tanks and the plant operations level is at the top of the tanks, or at various platform elevations in the surrounding plant.

Each actuator will normally have a local control site physically attached to the actuator itself, where an operator may typically select one of three modes for valve actuation. These modes are conventionally referred to as "local," "remote" and "off." In local mode, the operator may cause the actuator to, for example, (1) open the valve, (2) close the valve, or (3) stop during an open or close activity, all from the local site. In local mode, actuator controls on the actuator itself become "hot", allowing the operator to physically operate the actuator at the local site.

In remote mode, the local site will typically allow the operator to ordain that valve actuator operations such as "open", "close" or "stop" at that site may be controlled from a remote location via, for example, a distributed control system (DCS). In remote mode, the local controls on the actuator itself are disabled, and control of the actuator is given to some remote control center connected to the actuator.

In off mode, the local site will typically allow the operator to shut down valve actuator operations at that local site (i.e., the actuator will not work again until either local or remote mode is re-selected).

Remote replication of such local mode selection is also advantageous. In the above example, if mode selection is also provided on the ground near the base of the tank, operators may select or change the mode of the valve actuator without climbing the tank. Further, co-location of remote access to several actuators on the ground, or perhaps at a control site, will allow the operator to select modes of those actuators in a coordinated fashion.

In addition to convenience, there are good reasons to provide remote replication of local actuator mode selection in plants generally. There may be a of loss of communication with the DCS, failure of the DCS, or other emergencies requiring operators to override DCS control. There is also always a requirement for maintenance. In these situations, remote replication of local mode control becomes advantageous.

It is common practice for plant design to include expensive platforms, catwalks, etc. with stairs or ladders just to allow plant operators physical access valve actuators at the actuator site in case of such emergencies or maintenance. It is typical in plants to find valves located above or below floor level requiring special equipment (such as ladders, scaffolding, skyclimbers, etc.) just to access local controls of the valve actuator. Of course, physical access to the actuators cannot be totally eliminated. In the case of a power failure, for example, access to hand wheel operation is required at some critical valves. This does not diminish the advantages provided by remote replication of local valve actuator functions such as mode control.

Hardwiring is a common conventional technique for enabling remote replication of local functionality. It is conventional for local function activators to be hardwired to their remote counterparts so that the function can be activated at either location. In the example of local/remote valve actuator control described above, it will be seen that two separate subsystems require hardwiring if this conventional technique is to be used. First, remote control of local mode selection needs hardwiring. Secondly, remote control of the valve actuator operations (e.g., open, close, stop) also needs hardwiring to allow such remote control in the event that remote mode is also selected. Such complicated hardwiring is expensive to design, install and maintain.

In fact, conventional valve actuator control systems provide only one hardwired selector switch. The single selector switch may be located physically at the local valve actuator, or at a remote replication site, but not both. While it is technically possible to construct a system with two hardwired selector switches, the number of interconnected wires increases to the point where the cost of the actuator is unreasonably inflated and/or functionality is lost. Having only one selector switch requires its physical site to be chosen during plant design and oftentimes prior to procurement of the valve actuator. Uncertainty as to the location of optimal actuator control is thus introduced.

There is a need in the art to simplify the implementation of at least remote replication of local mode control. In the example of valve actuation as described above, optimizations in plant control costs could be obtained if, without hardwiring, mode selection control could be replicated in at least one or two additional locations remote from the local actuator site, such as at the base of the tank and/or at some interim co-located control site. Further optimizations could be obtained if such a system was scalable, to work in conjunction with conventional techniques (such as DCS) for remote control of the valve actuator operations themselves once remote mode is selected.

SUMMARY OF THE INVENTION

These and other needs in the art are addressed by a system comprising a local site served by at least one remote site in digital logic communication therewith, the system further comprising mode selection logic including a hierarchy that prioritizes modes available at the local site. The hierarchical priority of a particular mode that may be selected at the local or any one of the remote sites determines the mode in which the local site will operate, further depending on the current mode selection state at other remote or local sites.

A presently preferred embodiment of the present invention is a valve actuator having three-way local mode selection capability (local/remote/off), where such mode control is additionally served by at least one remote site connected via a serial link to the local site of the actuator. In this exemplary embodiment, a hierarchy prioritizes these modes in the following order of high priority to low priority: (1) off; (2) local; (3) remote. Under the logic of the invention, if the "off" mode is selected at the local site or any one of the remote sites, then all the sites will behave in "off" mode. If the "local" mode is selected at the local site or any one of the remote sites, and no site is in "off" mode, then all the sites will behave in "local" mode. If the "remote" mode is selected at the local site and all of the remote sites, then all the sites will behave in "remote" mode. Such illustrates a local mode selection logic that includes a hierarchy where the hierarchy is disposed to prioritize at least two of the plurality of the local modes selected at the plurality of the sites in a high priority to a low priority order, independently of the site selecting in the local mode. For example, if either the local site or a remote site selects "off," all sites behave in an off mode; this is independent of the site selecting the local mode.

In the presently preferred embodiment, the local site and each remote site advantageously each have a display module providing at least the following functionality: mode selector switches; valve actuation switches; and displays indicating, for example, the degree of "openness" of the valve.

It will therefore be seen that a technical advantage of the present invention is that under the above logic, operators may have local control over mode selection from any of the remote display modules (RDMs) connected logically to a local valve site, as well as at the local site itself. Operators, thus, no longer have to be physically present at a valve actuator (or hardwired selector switch site) to exercise local mode selection, and therefore local control over actuator functionality.

Assume a normal setting of a local valve site and all RDMs for that site are to be in "remote" mode. In such a case, normal valve actuation will generally be controlled remotely by a distributed control system (DCS). The local site and all of the RDMs for that site will advantageously display the condition of the valve or the actuator, but when they are all in remote mode, all actuator control will be by the remote system.

Now assume an event occurs that requires, for example, an operator to open or close a valve locally. By going either to the local valve site or any of RDMs for that site, the operator may switch the mode selector to "local." Under the logic of the present invention, control over the valve actuator is now given to the local site or to any of the RDMs for that local site. In one embodiment, local actuator control is given wherever "local" mode has been selected. In another embodiment, actuator control is given to the local site and all of its RDMs, regardless of where "local" mode has been physically selected.

The operator may now operate the valve (e.g., open, close or stop) at the local site or at any of the RDMs for that site, and may further continue to monitor the displays regarding valve condition (e.g., degree of openness) at the local site or at any RDM for that site. The operator, thus, has local control over the valve without having to be physically present at the valve.

The operator must return the local site, and all RDMs for that site, to "remote" mode to restore actuator control to the DCS. Oftentimes, this may be as simple as restoring one "remote" setting to the selector that was previously changed to "local" to give the operator local control at that site.

Assume now that the operator needs to disable valve actuator operations temporarily, such as in some type of emergency, or to conduct DCS programming, for example. The operator may go to the local valve site, or to any of the RDMs for that site, and switch the mode to "off." Under the logic of the present invention, the actuator is now disabled until the switch in the "off" position is restored to either local or remote mode. Again, the operator has achieved local control over the valve without having to be physically present at the valve.

A further technical advantage of the present invention is that mode selection at the local valve site and at the RDMs for that site do not need to be hardwired together. Under the present invention, multiple mode selection switches are in digital logic communication. Communication effectuating this type of logic may be accomplished using a twisted wire pair and, for example, a serial RS485 communication protocol. A local site and its RDMs may each have a programmable logic controller (PLC) or other suitable hardware that is compatible with such a serial link and embodying and implementing the logic as communicated between them.

A further technical advantage of the present invention is that it downplays the importance of remote control systems such as a DCS. This is advantageous because additional redundancy is now built into control systems, enhancing safety. Further, local operation of a valve actuator may be accomplished distant from a particular valve site, but perhaps not so distant as to be out of visual contact from the actuator. Such remote control in visual range is not often achievable via a DCS whose operator usually sits in a central plant control room.

Redundancy in control systems is recognized as having safety advantages. For example, firefighting systems often require redundant control systems or an override system remote from the primary control system (such as a DCS) in case the primary system is involved in the fire. Critical valves in the firefighting system typically include water and foam supply pipes to fight the fire. Embodiments of the present invention will be seen to give plant firefighting systems additional remote capability in operating valves included in such firefighting systems. In some applications, the need for a redundant DCS firefighting control system could even be eliminated.

A further technical advantage of the present invention is that valve actuator functionality may be programmed locally from either the local site or any one of its RDMs, and then the status of that functionality may be replicated at all of the other sites in that group. For example, suppose it is desired to set a readout for a particular valve's position detector to zero when the valve is fully open. An operator may go to either the local valve site or any one of its RDMs and set the mode to "local." The valve may then be opened fully from the operator's location. Then, still at that location, the operator may set the valve position readout at that location to zero using, for example, an infra-red communicator (e.g., key-chain, handheld, laptop or other infra-red enabled device). Communication between the local site and its RDMs over the serial link will automatically reset all of the valve position readouts in that group to zero.

A further technical advantage of the present invention is that it facilitates DCS programming of valve operations. A DCS having remote control over valve operations generally interfaces a programming CPU connected to all of the valves via a network. In the past, such valve control programming would have to be done at the site of the DCS CPU, normally at a control room.

According to the present invention, however, one embodiment may comprise a portable CPU such as a laptop with, for example, an RS485 serial port. The CPU's serial port is compatible with the above-described twisted pair network connecting the local valve site and its RDMs for replication of mode selection. The CPU may advantageously connect to the twisted pair network via a complementary RS485 CPU port provided at the local valve site and on each of its RDMs. In this embodiment, local valve sites and connected RDMs will each require a microprocessor addressable via the CPU port and compatible via a serial link to any other microprocessor in the twisted pair network.

In order to program using the portable CPU, the local valve site and its RDMs must first be switched to "off" mode. The operator may connect the CPU to the twisted pair network via the serial port at any connection point, such as at the local valve site, any of its RDMs, or at a wire junction box. The operator may then turn the mode selector to "off" mode at that connected CPU location. This action will set the connected local valve site and all RDMs to "off" mode. Programming communication may then be had at all locations via the serial link from the location at which the CPU is connected.

A further technical advantage of the present invention is that it facilitates, and to a certain extent simplifies, security when actuator mode selection is desired to be locked. It is not uncommon to encounter requirements for lockable selector switches throughout all industries where electric motor valve actuators are used. Under such requirements, valve actuator manufactures are often configured to provide local ability to lock the mode selector switch in any one of the Local, Off or Remote positions. This is normally done with a padlock, or alternatively the mode selector switch may be designed only to turn with the insertion of a key. Such security prevents accidental or unauthorized operation of the valve in local mode when it is intended to be locked in remote mode. This security further provides safety for maintenance by locking the local mode selector in "off" mode. Lockout (locked in "off" position) may also be required during special operations to protect critical processes, for example, or to prevent hazards or product contamination.

It will be seen that embodiments of the present invention will facilitate the security that accompanies providing locking mode selector switches. In these embodiments, the mode selector may be locked on "remote" mode at the local valve site and all of its RDMs. In this locked mode, there is security that a DCS will be in control without accidental or unauthorized override. If desired, an authorized operator with a key or combination code may then unlock the mode selector switch at either the local valve site or any one of the RDMs and place the selector switch in "local" mode to override the DCS. In these embodiments, this action allows local valve actuator operation only at the unlocked site, since all the other available sites (local valve sites or RDMs) are still locked on "remote" mode. In an embodiment where local actuator control is given only to the site where "local" mode has been selected, unauthorized or accidental operation is thus prevented at all other locked sites.

Likewise, an operator may lock out the mode selector switch (i.e., lock the mode selector switch in the "off" mode at the local valve site or any one of its RDMs). Accidental, unauthorized or unsafe operation of the valve actuator is prevented while maintenance is being performed.

The foregoing has outlined rather broadly the features and technical advantages of the present invention in order that the detailed description of the present invention that follows may be better understood. Additional features and advantages of the invention will be described hereinafter which form the subject of the claims of the invention. It should be appreciated by those skilled in the art that the conception and the specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

For a more complete understanding of the present invention, and the advantages thereof, reference is now made to the following descriptions taken in conjunction with the accompanying drawings, in which.

DETAILED DESCRIPTION OF THE INVENTION

Figure 1:
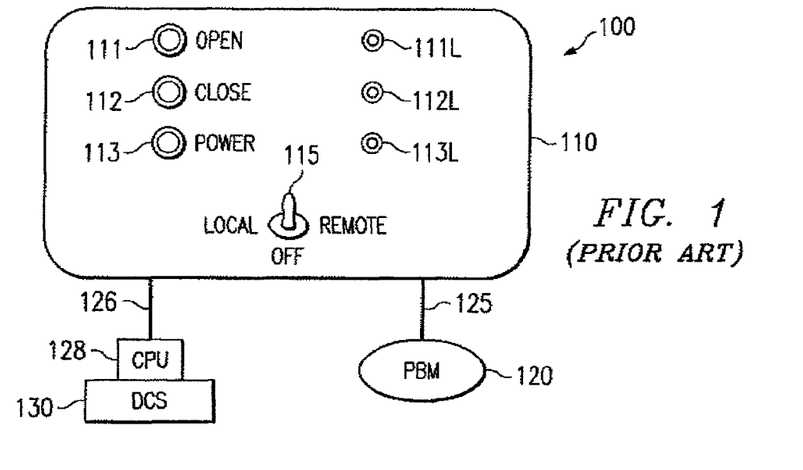
FIG. 1 illustrates an exemplary prior art valve actuator control system 100.

FIG. 1 illustrates an exemplary prior art system 100 in which a conventional actuator control module 110 is typically found physically located at or near a valve actuator itself. The conventional actuator control module 110 typically comprises push button functionality to activate the valve actuator. For example, as shown on FIG. 1, push buttons 111, 112 and 113 are provided to open, close or cut/engage power to the activator. Monitor lamps 111L, 112L and 113L illuminate when the corresponding functions are engaged by push buttons 111, 112 or 113.

Mode selection on conventional actuator control module 110 is typically provided via a selector switch. In FIG. 1, it will be seen that selector switch 115 allows the operator to select between "local", "off" and "remote" modes. As described more generally above, in "local" mode, control over the valve actuator is given to push buttons 111, 112 and 113 so that an operator may operate the valve at the valve site. In "remote" mode, push buttons 111, 112 and 113 are deactivated, and control over the valve actuator is given to DCS 130 (shown on FIG. 1 to be addressing conventional actuator control module 110 via CPU 128 connected through network 126). In "off" mode, the valve actuator is completely disabled until either "local" or "remote" mode is selected again.

In the exemplary prior art system 100, replication of some of the functionality of conventional actuator control module 110 is typically achieved using push button module 120 (PBM). FIG. 1 illustrates PBM 120 connected to conventional actuator control module 110 via PBM hardwire connection 125, as is typical in the prior art. PBMs are generally located remote from the valve site (for example, at the bottom of a tank or on a different plant platform elevation) and will be understood to replicate the push button functionality of the conventional actuator control module 110 by providing additional push buttons corresponding to push buttons 111, 112 and 113 found on conventional actuator control module 110.

In the prior art system of FIG. 1, therefore, the operator may only replicate local actuator control (open, close, power) at additional PBM sites. There is no provision for replication of local mode selection at the PBM sites. Additionally, because of the complexity of hardwiring, it is the norm in the art for only one PBM 120 to be provided per conventional actuator control module 110. PBM hardwire connections 125 will require up to 15 wires to be hardwired just to replicate in each one the push button functionality of conventional actuator control module 110 illustrated in FIG. 1.

Figure 2:
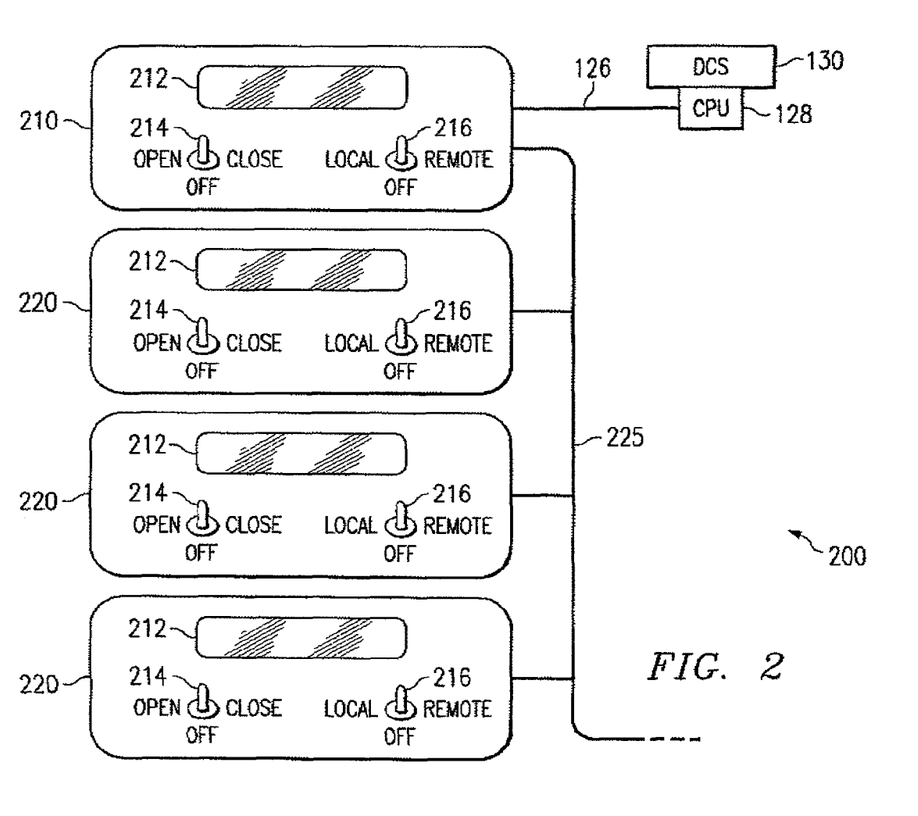
FIG. 2 illustrates the present invention embodied on an exemplary valve actuator control system 200.

FIG. 2 illustrates a system 200 embodying the present invention in a valve actuator environment. It will be understood that the invention is not limited to the field of valve actuators, and that the invention should apply with equal enabling effect on any system where local mode control is desired to be replicated in multiple additional locations.

FIG. 2 shows actuator site module 210, and will be understood to be located physically at or near a valve actuator itself. In FIG. 2, actuator site module 210 provides valve control switch 214 and selector switch 216 for actuator control and mode control respectively. It will be seen on FIG. 2 that valve control switch 214 gives the operator the option to cause the actuator to open the valve, close the valve, or to cut power to the actuator. It will be further seen that selector switch 216 gives the operator the option to place actuator site module 210 in either "remote," "local" or "off" modes. It will be appreciated that selection of one of these modes will have the same effect on actuator site module 210 as would selection of the correspondingly designated mode on selector switch 115 on FIG. 1, as described above.

With further reference to actuator site module 210 on FIG. 2, display 212 may advantageously be a LCD display giving selectable readouts on valve functions or conditions such as valve position. Display 212 may also give other information, such as alphanumeric alerts or messages, or alphanumeric responses to programming or setup instructions given to the actuator.

FIG. 2 further shows that, analogous to FIG. 1, remote operation of system 200 is still accomplished by DCS 130. Network 126 continues to connect actuator site module 210 to DCS 130 via CPU 128 on FIG. 2 for control and programming purposes. As in FIG. 1, DCS 130 on FIG. 2 will be in control when system 200 is in "remote" mode.

In FIG. 2, however, serial link connection 225 interconnects actuator site module 210 and remote display modules (RDMs) 220. RDMs 220 will be described in more detail below. Serial link connection 225 may be embodied by any suitable serial connectivity known in the art, such as a twisted pair enabling serial communication via, for example, an RS485 protocol.

RDMs 220 on FIG. 2 will be understood to be additional display modules located remotely from the valve actuator (and actuator site module 210) such as at the bottom of a tank or at different platform elevations in a plant. Although three RDMs 220 are illustrated on FIG. 2, it will be understood that under the present invention there is no limit to the number of RDMs 220 that may be interconnected with a particular actuator site module 210. According to the invention, each RDM 220 provides selector switch 216 to give the operator local mode control at that RDM 220 over the valve actuator. Each RDM 220 also provides valve control switch 214 that gives the operator control at that RDM 220 over the actuator itself when system 200 is in "local" mode. Moreover, each RDM 220 also provides display 212 having the same alphanumeric functionality as its counterpart display 212 on actuator site module 210, as described above. Thus, by replicating mode selection at each RDM 220, the present invention allows the operator (when "local" mode is selected) to operate the actuator at any RDM 220 and to view the corresponding display readout at that RDM 220. In one embodiment, local actuator control is given wherever "local" mode has been selected. In another embodiment, actuator control is given to the actuator site module 210 and all of its RDMs 220, regardless of where "local" mode has been physically selected.

In order to implement this replication of mode selection, the invention embodies mode selection logic as follows (as will be understood to apply to one actuator site module 210 and all of its interconnected RDMs 220):

(a) When any selector switch 216 is in the "off" position, all modules 210 and 220 will behave as if their selector switch is in the "off" position (high priority);

(b) When any selector switch 216 is in the "local" position and no other selector switch 216 is in the "off" position, all modules 210 and 220 will behave as if their selector switch is in the "local" position (intermediate priority); and     (c) When all selector switches 216 are in the "remote" position, all modules 210 and 220 will behave as if their selector switches are in the "remote" position (low priority).

Although not illustrated on FIG. 2, it will be understood that modules 210 and 220 communicate the above mode selection logic between them via serial link connection 225. Conventional control hardware such as a programmable logic controller in each module will be understood to report and receive logic states via an RS485 protocol so as to implement the mode selection logic.

Distinctions between the exemplary prior art system 100, as shown on FIG. 1, and a system 200 embodying the present invention such as shown on FIG. 2, should be readily apparent. FIG. 2 provides mode selection control replicated at locations remote from the valve actuator site, whereas, conventionally, in FIG. 1, only valve operation control could be so replicated.

FIG. 2 has also provided valve operation control replicated at locations remote from the valve actuator site, where that valve operation control is in selector switch form. Since mode selection logic within FIG. 2 has now obviated the need for hardwiring between modules, push buttons for actuator control (as shown in FIG. 1) are now no longer mandated. When system 200 on FIG. 2 is selected to be in "local" mode, any module 210 or 220 may control the actuator. Its controls may operate the actuator, and actuator operation instructions from the "module in command" are communicated to actuator site module 210 via serial link connection 225. There is, therefore, no artificial design limitation on the type or style of valve control switch 214 that may be provided on each module 210 or 220 in FIG. 2, because, unlike as on FIG. 1, they do not have to be hardwired together. The embodiment on FIG. 2 shows valve control switches 214 in selector switch form, but other embodiments may use other conventional switch types or styles, such as, for example, rocker switches or push buttons.

FIG. 2 has further provided display access and functionality replicated at locations remote from the valve actuator site. In FIG. 1, exemplary prior art system 100 already comes with the overhead of hardwiring monitor lamps 111L, 112L and 113L to PBM 120. If a systems designer wished to replicate additional display functionality at PBM 120, then this would add to the hardwiring burden. By contrast in FIG. 2, displays 212 on each module 210 or 220 may be maintained in a replicated state via digital communication over serial link connection 225.

Replication of display functionality on FIG. 2 further enables programming of all displays 212 simultaneously from any module 210 or 220 in system 200. The operator may, for example, set system 200 to "local" mode from any module 210 or 220, and then set limits or conduct other local actuator programming at that module by communicating with the display 212 at that module. Such programming may be by, for example, infra-red devices or other conventional wireless communication devices. Alternatively, programming button or key functionality may be provided at the display 212 (not illustrated). Further to the present invention, hardware at the display 212 from which the operator is programming will then, via serial link connection 225, communicate with other hardware at all other displays 212. This communication will replicate the programming at all other displays 212.

Figure 3:
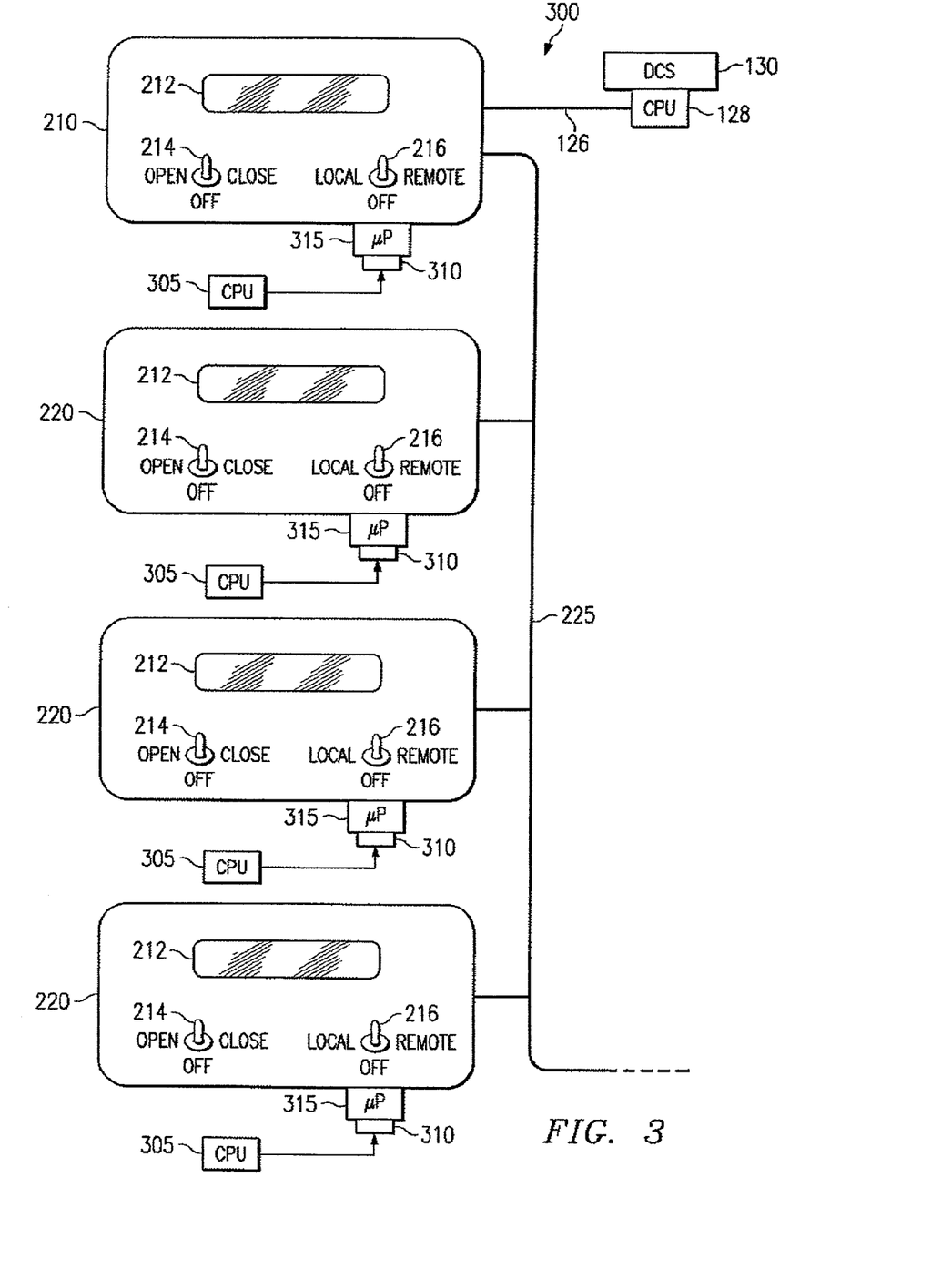
FIG. 3 illustrates the present invention embodied on an exemplary valve actuator control system 300 providing local CPU access for DCS programming.

FIG. 3 illustrates a further embodiment of the invention. In FIG. 3, system 300 is configured substantially the same way as is illustrated in FIG. 2. In FIG. 3, however, each module 210 or 220 provides a microprocessor 315 accessed by a serial port 310. In the embodiment of FIG. 3, a portable CPU 305 (such as a laptop) may be connected to a module 210 or 220 via serial port 310.

In this way, an operator may conduct DCS programming of actuators while physically located near the actuator or at an RDM 220. Normally such DCS programming would have to be done distant from the actuator, traditionally in a control room. As shown on FIG. 3, however, the present invention allows the operator to go to any module 210 or 220 and select the "off" mode at that module. According to the logic of the present invention, all modules 210 or 220 in system 300 will then behave as if in "off" mode. The operator may then connect portable CPU 305 to the module 210 or 220 and address microprocessor 315 therein to conduct DCS programming. Serial link connection 225 enables replication of that programming at all other modules 210 or 220. Serial link connection 225 further enables communication of the programming back to CPU 128 via network 126, and on into the overall DCS 130 network.

Although the present invention and its advantages have been described in detail, it should be understood that various changes, substitutions and alterations can be made herein without departing from the spirit and scope of the invention as defined by the appended claims.

We claim:

1. A system for remote replication of a local valve actuator mode selection functionality, the local valve actuator mode selection functionality having a plurality of local modes and a plurality of operatable modes, the system comprising:
a plurality of sites, the plurality of the sites comprising a local site and at least one remote site, wherein a selector mechanism of each of the plurality of the sites is disposed to select between the plurality of the local modes and between the plurality of the operatable modes;
the local site in communication with the at least one remote site and at least one electronic processor embodying mode selection logic; and
a local mode selection logic embodied in the least one electronic processor wherein the local mode selection logic comprises a hierarchy, the hierarchy disposed to prioritize at least two of the plurality of the local modes selected at the plurality of the sites in a high priority to low priority order, independently of the site selecting the local mode, such that the at least one remote site can affect a selection of a valve actuator local mode.

2. The system of claim 1, wherein the local site is in serial link connection to the at least one remote site, and wherein the local site is in digital logic communication with the at least one remote site.

3. The system of claim 1 wherein the hierarchy of the at least two of the plurality of the local modes selected is further disposed to determine at least one of the plurality of the sites to select at least one of the plurality of the operatable modes.

4. The system of claim 1 wherein the priority of a particular one of the plurality of the local modes selected at a particular one of the plurality of the sites is disposed to depend on concurrent local modes selected at other sites.

5. The system of claim 1, wherein the at least one of the plurality of the local modes is selected from a group including:
(A) an off mode;
(B) a local mode; and
(C) a remote mode.

6. The system of claim 5, wherein the hierarchy prioritizes the at least two of the plurality of the local modes selected in the high priority to low priority order comprising:
(A) a selection of the off mode by at least one of the local site and the at least one remote site having the high priority, the selection of the off mode disposed to disable the operatable mode selectability at the plurality of the sites;
(B) a selection of the local mode by at least one of the local site and the at least one remote site and no selection of the off mode by the local site and the at least one remote site having an intermediate priority, the selection of the local mode and no selection of the off mode disposed to enable only sites that have selected the local mode to select an operatable mode; and
(C) a selection of the remote mode by the plurality of the sites having the low priority, the selection of the remote mode disposed to enable the plurality of the sites to operate in remote mode, and wherein a remote control center is disposed to select an operatable mode.

7. The system of claim 5, wherein the hierarchy prioritizes the at least two of the plurality of the local modes selected in the high priority to low priority order comprising:
(A) a selection of the off mode by at least one of the local site and the at least one remote site having the high priority, the selection of the off mode disposed to disable the operatable mode selectability at the plurality of the sites;
(B) a selection of the local mode by at least one of the local site and the at least one remote site and no selection of the off mode by the local site and the at least one remote site having an intermediate priority, the selection of the local mode and no selection of the off mode disposed to enable the plurality of the sites to select an operatable mode; and
(C) a selection of the remote mode by the plurality of the sites having the low priority, the selection of the remote mode disposed to enable the plurality of the sites to operate in remote mode, and wherein a remote control center is disposed to select an operatable mode.

8. The system of claim 1, wherein the plurality of the sites further comprise a display functionality.

9. The system of claim 8, wherein the display functionality comprises alphanumeric functionality.

10. The system of claim 9, wherein the display functionality is disposed to enable programming of the alphanumeric functionality.

11. The system of claim 10, wherein the programming of a particular one of the plurality of the sites is communicated to at least one other of the plurality of the sites.

12. The system of claim 1, wherein each of the plurality of the sites has a local mode switch and an operatable mode switch, and wherein the local mode switch is disposed to select a particular one of the plurality of the local modes, and wherein the operatable mode switch is disposed to select a particular one of the plurality of the operatable modes.

13. The system of claim 12, in which the local mode switch and the operatable mode switch are further disposed to be locked in a particular mode.

14. The system of claim 1, wherein the at least one of the plurality of the operatable modes includes:
   (A) an open mode;
   (B) a closed mode; and
a power mode.

15. A system for remote selection of local valve actuator modes for a value actuator, the valve actuator having a plurality of the local valve actuation modes and valve actuation functionality, the system comprising:
   a plurality of local modes;
   a plurality of sites, the sites comprising at least one remote site, and wherein the sites are disposed to select with a selector mechanism the local modes and the local valve actuation functionality;
   the sites in communication; and
   a logic hierarchy embodied in at least one electronic processor in communication with the sites, the logic hierarchy disposed to prioritize the selected local modes, independently of the site selecting the local mode, wherein the logic hierarchy of the selected local modes is disposed to determine the sites to select the local valve actuation mode, thereby enabling a remote site to affect a local valve actuation mode.

16. The system of claim 15 wherein the logic hierarchy further prioritizes the local modes in a high priority to low priority order.

17. The system of claim 15, wherein the sites are in serial link communication and digital logic communication.

18. The system of claim 15, wherein the local modes include:
   (A) an off mode;
   (B) a local mode; and
   (C) a remote mode.

19. The system of claim 18, wherein the logic hierarchy prioritizes the local modes in a high priority to low priority order comprising:
   (A) a selection of the off mode by at least one of the sites having the high priority, the selection of the off mode disposed to disable the valve actuation functionality and the local valve actuation mode selectability at the sites;
   (B) a selection of the local mode by at least one of the sites and no selection of the off mode by a site having an intermediate priority, the selection of the local mode and no selection of the off mode disposed to enable only sites that have selected the local mode to select a local valve actuation functionality; and
   (C) a selection of the remote mode by the plurality of the sites having the low priority, the selection of the remote mode disposed to enable the plurality of the sites to operate in remote mode, and wherein a distributed control system (DCS) is disposed to select a local valve actuation functionality.

20. The system of claim 19, wherein the distributed control system (DCS) is connected to a site via a network and a central processing unit (CPU).

21. The system of claim 18, wherein the logic hierarchy prioritizes the local modes in a high priority to low priority order comprising:
   (A) a selection of the off mode by at least one of the sites having the high priority, the selection of the off mode disposed to disable the valve actuation functionality and the local valve actuation mode selectability at the sites;
   (B) a selection of the local mode by at least one of the sites and no selection of the off mode by the a site having an intermediate priority, the selection of the local mode and no selection of the off mode disposed to enable the plurality of the sites to select the local valve actuation functionality; and
   (C) a selection of the remote mode by the plurality of the sites having the low priority, the selection of the remote mode disposed to enable the plurality of the sites to operate in remote mode, and wherein a distributed control system (DCS) is disposed to select a local valve actuation functionality.

22. The system of claim 21, wherein the distributed control system (DCS) is connected to a site via a network and a central processing system (CPU).

23. The system of claim 15, wherein a distributed control system (DCS) is connected to a site via a network and a central processing unit (CPU).

24. The system of claim 15, wherein the sites comprise a microprocessor, the microprocessor of a particular site disposed to enable a portable central processing unit (CPU) to program the valve actuation functionality at the particular site.

25. The system of claim 24, wherein the programming at the particular site is communicated to at least one other site via the serial link.

26. The system of claim 25, wherein the programming is further communicated to a distributed control system (DCS) connected to a site.

27. The system of claim 15, wherein the sites further comprise a display having an alphanumeric functionality.

28. The system of claim 27, wherein the display of a particular site is disposed to enable programming of the alphanumeric functionality of the particular site and the valve actuation functionality.

29. The system of claim 28, wherein the programming is communicated to at least one other site.

30. The system of claim 29, wherein the programming is further communicated to a distributed control system (DCS) connected to a site.

31. The system of claim 15, wherein the sites comprise a local mode switch and a local valve actuation functionality switch, the local mode switch disposed to select the local mode, and the local valve actuation functionality switch disposed to select the local valve actuation functionality.

32. The system of claim 31, wherein the local mode switch and the local valve actuation mode switch are further disposed to be locked in a particular mode.

33. The system of claim 15, wherein the local valve actuation functionality is selected from a group including:
   (A) an open mode;
   (B) a closed mode; and
   (C) a power mode.

34. A system for remote replication of local valve actuator mode selection for a valve actuator, an actuator site module locally connected to the valve actuator, the valve actuator having a plurality of local valve actuation modes and valve actuation functionality, the system comprising:
   a plurality of local modes;
   at least one remote display module;
   the at least one remote display module and the actuator site module in communication;
   the actuator site module and the at least one remote display module each disposed to select with a selector mechanism the local modes and the local valve actuation functionality; and
   a logic hierarchy embodied in at least one electronic processor in communication with the modules, the logic hierarchy disposed to prioritize the local modes selected by the actuator site module and the at least one remote display module, independently of the module selecting the local mode, wherein the logic hierarchy of the selected local modes is disposed to determine the modules to select the local valve actuation functionality, such that the at least one remote display module can affect a selection of local valve actuator mode.

35. The system of claim 34, wherein the logic hierarchy further prioritizes the local modes in a high priority to low priority order.

36. The system of claim 34, wherein the at least one remote display module and the actuator site module are connected via a serial link, and wherein the at least one remote display module and the actuator site module are in digital logic communication.

37. The system of claim 34, wherein the local modes are selected from a group including:
  (A) an off mode;
  (B) a local mode; and
  (C) a remote mode.

38. The system of claim 37, wherein the logic hierarchy prioritizes the local modes in a high priority to low priority order comprising:
  (A) a selection of the off mode by at least one of the actuator site module and the at least one remote display module having the high priority, the selection of the off mode disposed to disable the valve actuation functionality and the local valve actuation mode selectability at the actuator site module and the at least one remote display module;
  (B) a selection of the local mode by at least one of the actuator site module and the at least one remote display module and no selection of the off mode by the actuator site module and the at least one remote display module having an intermediate priority, the selection of the local mode and no selection of the off mode disposed to enable only modules that have selected the local mode to select a local valve actuation functionality;
  (C) a selection of the remote mode by the actuator site module and the at least one remote display module having the low priority, the selection of the remote mode disposed to enable the actuator site module and the at least one remote display module to operate in remote mode, and wherein a distributed control system (DCS) is disposed to select a local valve actuation functionality.

39. The system of claim 38, wherein the distributed control system (DCS) is connected to the actuator site module via a network and a central processing unit (CPU).

40. The system of claim 37, wherein the logic hierarchy prioritizes the local modes in a high priority to low priority order comprising:
  (A) a selection of the off mode by at least one of the actuator site module and the at least one remote display module having the high priority, the selection of the off mode disposed to disable the valve actuation functionality and the local valve actuation mode selectability at the actuator site module and the at least one remote display module;
  (B) a selection of the local mode by at least one of the actuator site module and the at least one remote display module and no selection of the off mode by the actuator site module and the at least one remote display module having an intermediate priority, the selection of the local mode and no selection of the off mode disposed to enable all modules to select the local valve actuation functionality; and
  (C) a selection of the remote mode by the actuator site module and the at least one remote display module having the low priority, the selection of the remote mode disposed to enable the actuator site module and the at least one remote display module to operate in remote mode, and wherein a distributed control system (DCS) is disposed to select a local valve actuation functionality.

41. The system of claim 40, wherein the distributed control system (DCS) is connected to the actuator site module via a network and a central processing unit (CPU).

42. The system of claim 34, wherein a distributed control system (DCS) is connected to the actuator site module via a network and a central processing unit (CPU).

43. The system of claim 34, wherein the actuator site module and the at least one remote display module comprise a microprocessor, the microprocessor of a particular module disposed to enable a portable central processing unit (CPU) to program the valve actuation functionality at the particular module.

44. The system of claim 43, wherein the programming of the particular module is communicated to at least one other module via a serial link.

45. The system of claim 44, wherein the programming is further communicated to a distributed control system (DCS) connected to the actuator site module.

46. The system of claim 34, wherein the actuator site module and the at least one remote display module comprise a display having an alphanumeric functionality.

47. The system of claim 46, wherein the display of a particular module is disposed to enable programming of the alphanumeric functionality of the particular module and the valve actuation functionality.

48. The system of claim 47, wherein the programming is communicated to at least one other module.

49. The system of claim 48, wherein the programming is further communicated to a distributed control system (DCS) connected to the actuator site module.

50. The system of claim 34, wherein the actuator site module and the at least one remote display module comprise a local mode switch and a local valve actuation functionality switch, the local mode switch disposed to select the local mode, and the local valve actuation functionality mode switch disposed to select the local valve actuation functionality.

51. The system of claim 50, wherein the local mode switch and the local valve actuation functionality switch are further disposed to be locked in a particular mode.

52. The system of claim 34, wherein the local valve actuation functionality is selected from a group including:
  (A) an open mode;
  (B) a closed mode; and
  (C) a power mode.

53. A method of replicating local valve actuator mode selection for a valve actuator, the valve actuator having a local site and valve actuation functionality, the method comprising:
  (A) connecting the local site to the valve actuator;
  (B) connecting the local site to at least one remote site;
  (C) communicating between the local site and the at least one remote site;
  (D) using the local site and the at least one remote site to select a local mode at each site,
  (E) using a logic hierarchy to prioritize the selected local modes, independently of the site selecting the local mode;
  (F) selecting a local valve actuation mode; and
  (G) displaying the valve actuation functionality on a display of the local site and the at least one remote site.

54. The method of claim 53, wherein (D) further comprises using a local mode switch to select the local mode, the local site and the at least one remote site having a local mode switch.

55. The method of claim 54, wherein using the local mode switch further comprises locking the local mode switch in the selected local mode.

56. The method of claim 53, wherein (D) further comprises selecting a local mode from a group including:
(1) an off mode;
(2) a local mode; and
(3) a remote mode.

57. The method of claim 56, wherein (E) further comprises using the logic hierarchy prioritized in a high priority to low priority order comprising:
(1) a selection of the off mode by at least one of the local site and the at least one remote site having the high priority, the selection of the off mode disposed to disable the valve actuation functionality and the local valve actuation mode selectability at the local site and the at least one remote site;
(2) a selection of the local mode by at least one of the local site and the at least one remote site and no selection of the off mode by the local site and the at least one remote site having an intermediate priority, the selection of the local mode and no selection of the off mode disposed to enable only sites that have selected the local mode to select a local valve actuation functionality; and
(3) a selection of the remote mode by the local site and the at least one remote site having the low priority, the selection of the remote mode disposed to enable the local site and the at least one remote site to operate in remote mode, and wherein a distributed control system (DCS) is disposed to select a local valve actuation functionality.

58. The method of claim 57, wherein disposing the distributed control system (DCS) to select the local valve actuation mode further comprises connecting the distributed control system (DCS) to the local site via a network and a central processing unit (CPU).

59. The method of claim 56, wherein (E) further comprises using the logic hierarchy prioritized in a high priority to low priority order comprising:
(1) a selection of the off mode by at least one of the local site and the at least one remote site having the high priority, the selection of the off mode disposed to disable the valve actuation functionality and the local valve actuation mode selectability at the local site and the at least one remote site;
(2) a selection of the local mode by at least one of the local site and the at least one remote site and no selection of the off mode by the local site and the at least one remote site having an intermediate priority, the selection of the local mode and no selection of the off mode disposed to enable all sites to select the local valve actuation functionality; and
(3) a selection of the remote mode by the local site and the at least one remote site having the low priority, the selection of the remote mode disposed to enable the local site and the at least one remote site to operate in remote mode, and wherein a distributed control system (DCS) is disposed to select a local valve actuation functionality.

60. The method of claim 59, wherein disposing the distributed control system (DCS) to select the local valve actuation mode further comprises connecting the distributed control system (DCS) to the local site via a network and a central processing unit (CPU).

61. The method of claim 53, wherein (E) further comprises prioritizing the selected local modes in a high priority to low priority order.

62. The method of claim 61, wherein prioritizing the selected local modes in the priority order further comprises determining the sites to select the local valve actuation functionality.

63. The method of claim 53, wherein (F) further comprises selecting the local valve actuation functionality from a group including:
(1) an open mode;
(2) a closed mode; and
(3) a power mode.

64. The method of claim 53, wherein (F) further comprises using a local valve actuation mode switch to select the local valve actuation mode, the local site and the at least one remote site each having the local valve actuation mode switch.

65. The method of claim 64, wherein using the local valve actuation mode switch further comprises locking the local valve actuation mode switch in the selected local valve actuation mode.

66. The method of claim 53, further comprising:
(H) programming the valve actuation functionality at a particular one of the local site and the at least one remote site.

67. The method of claim 66, wherein the programming of the valve actuation functionality further comprises communicating the programming to at least one other site.

68. The method of claim 67, wherein communicating the programming further comprises communicating the programming to a distributed control system (DCS) connected to the local site.

69. The method of claim 66, wherein (H) further comprises using at least one electronics device from the group consisting of:
(1) a portable distributed control system (DC S); and
(2) the display having an alphanumeric functionality.

70. The method of claim 69, wherein using the portable distributed control system (DCS) further comprises accessing a particular site having a microprocessor with the portable distributed control system (DCS) via the microprocessor of the particular site.

71. The method of claim 69, wherein using the display of a particular site to program the valve actuation functionality further comprises using the display of the particular site to program the alphanumeric functionality of the display of the particular site.

72. The method of claim 71, wherein the programming of the alphanumeric functionality further comprises communicating the programming of the alphanumeric functionality to at least one other display.

73. The method of claim 72, wherein communicating the programming of the alphanumeric functionality further comprises communicating the alphanumeric functionality to a distributed control system (DCS) connected to the local site.

74. A system for remote replication of local valve actuator mode selection for a valve actuator, an actuator site module locally connected to the valve actuator and having local mode selection, the valve actuator having a plurality of local valve actuation modes and valve actuation functionality, the system comprising:
at least one remote display module;
the at least one remote display module and the actuator site module connected via a serial link, wherein the at least one remote display module and the actuator site module are in digital logic communication;

a distributed control system (DCS) connected to the actuator site module via a network and a central processing unit (CPU);

the actuator site module and the at least one remote display module each comprising a local mode switch and a local valve actuation functionality switch, the local mode switch disposed to select the local mode, the local valve actuation functionality switch disposed to select the local valve actuation functionality;

the actuator site module and the at least one remote display module having a plurality of displays, the displays having alphanumeric functionality, the display of a particular module disposed to enable programming of the alphanumeric functionality of the particular module and the valve actuation functionality; and a logic hierarchy, embodied in at least one electronic processor in communication with the actuator site module and the remote display module that prioritizes the local modes selected by each of the actuator site module and the at least one remote display module, independently of the module selecting the local mode, in a high priority to low priority order, such that the at least one remote display module can affect a selection of the local valve actuator mode.

75. The system of claim 74, wherein the local modes are selected from a group including:
(A) an off mode;
(B) a local mode; and
(C) a remote mode.

76. The system of claim 75, wherein the logic hierarchy prioritizes the local modes in the high priority to low priority order comprising:
(A) a selection of the off mode by at least one of the actuator site module and the at least one remote display module having the high priority, the selection of the off mode disposed to disable the valve actuation functionality and the local valve actuation mode selectability at the actuator site module and the at least one remote display module;
(B) a selection of the local mode by at least one of the actuator site module and the at least one remote display module and no selection of the off mode by the actuator site module and the at least one remote display module having an intermediate priority, the selection of the local mode and no selection of the off mode disposed to enable only modules that have selected the local mode to select a local valve actuation functionality; and
(C) a selection of the remote mode by the actuator site module and the at least one remote display module having the low priority, the selection of the remote mode disposed to enable the actuator site module and the at least one remote display module to operate in remote mode, and wherein the distributed control system (DCS) is disposed to select a local valve actuation functionality.

77. The system of claim 75, wherein the logic hierarchy prioritizes the local modes in the high priority to low priority order comprising:
(A) a selection of the off mode by at least one of the actuator site module and the at least one remote display module having the high priority, the selection of the off mode disposed to disable the valve actuation functionality and the local valve actuation mode selectability at the actuator site module and the at least one remote display module;
(B) a selection of the local mode by at least one of the actuator site module and the at least one remote display module and no selection of the off mode by the actuator site module and the remote display module having an intermediate priority, the selection of the local mode and no selection of the off mode disposed to enable all modules to select the local valve actuation functionality; and
(C) a selection of the remote mode by the actuator site module and the at least one remote display module having the low priority, the selection of the remote mode disposed to enable the actuator site module and the at least one remote display module to operate in remote mode, and wherein the distributed control system (DCS) is disposed to select a local valve actuation functionality.

78. The system of claim 74, wherein the local valve actuation modes are selected from a group including:
(A) an open mode;
(B) a closed mode; and
(C) a power mode.

79. The system of claim 74, wherein the actuator site module and the at least one remote display module comprise a microprocessor, the microprocessor of a particular module disposed to enable a portable central processing unit (CPU) to program the valve actuation functionality at the particular module.

80. The system of claim 79, wherein the programming at the particular module via the portable central processing unit (CPU) is communicated to at least one other module via the serial link, and wherein the programming is further communicated to the distributed control system (DCS).

81. The system of claim 74, wherein the programming at a particular module via the display is communicated to at least one other module via the serial link, and wherein the programming is further communicated to the distributed control system (DCS).

82. The system of claim 74, wherein the local mode switch and the local valve actuation functionality switch are further disposed to be locked in a particular mode.

* * * * *